United States Patent
Sádaba et al.

(10) Patent No.: US 8,355,825 B2
(45) Date of Patent: Jan. 15, 2013

(54) WIND FARM

(75) Inventors: Oscar Alonso Sádaba, Navarra (ES);
Ricardo Royo García, Navarra (ES);
Miguel Núñez Polo, Navarra (ES)

(73) Assignee: Acciona Windpower, S.A. (ES)

( * ) Notice: Subject to any disclaimer, the term of this patent is extended or adjusted under 35 U.S.C. 154(b) by 310 days.

(21) Appl. No.: 12/743,444

(22) PCT Filed: Nov. 19, 2008

(86) PCT No.: PCT/ES2008/000722
§ 371 (c)(1),
(2), (4) Date: Jul. 14, 2010

(87) PCT Pub. No.: WO2009/065985
PCT Pub. Date: May 28, 2009

(65) Prior Publication Data
US 2010/0274399 A1  Oct. 28, 2010

(30) Foreign Application Priority Data

Nov. 20, 2007  (ES) ................................. 200703055

(51) Int. Cl.
*F03D 9/00* (2006.01)
*H02P 9/04* (2006.01)
*G05B 19/18* (2006.01)
*G05B 15/02* (2006.01)
*G05B 11/01* (2006.01)
*G05B 13/02* (2006.01)
*G05B 15/00* (2006.01)
*G05D 3/12* (2006.01)
*G05D 5/00* (2006.01)
*G05D 9/00* (2006.01)

(52) U.S. Cl. .................. 700/287; 700/3; 700/9; 700/19; 700/20; 700/40; 700/75; 700/286; 290/44; 290/55

(58) Field of Classification Search .................. 700/3, 9, 700/19–20, 40, 75, 286–287; 290/44, 55
See application file for complete search history.

(56) References Cited

U.S. PATENT DOCUMENTS 6,891,281 B2  5/2005 Wobben
(Continued)

FOREIGN PATENT DOCUMENTS

EP  1 282 774  2/2003
(Continued)

OTHER PUBLICATIONS

International Search Report dated Apr. 14, 2009, issued in corresponding international application No. PCT/ES2008/000722.

*Primary Examiner* — Ronald Hartman, Jr
(74) *Attorney, Agent, or Firm* — Ostrolenk Faber LLP

(57) ABSTRACT

Wind farm, of the kind that comprises a series of wind turbine generators, which consist of a rotor, a generator, a control unit and means of connection to the computing network for the wind farm of which they form part, in such a way that at least two of the wind turbine generators in the farm can assume a leader hierarchy for the wind farm, accessing the operating data of the rest of the wind turbine generators, calculating and sending instructions to the rest of the wind turbine generators making up that wind farm, and a subject hierarchy, receiving and following the instructions coming from the leader wind turbine generator of the wind farm.

20 Claims, 4 Drawing Sheets

U.S. PATENT DOCUMENTS

| | | | |
|---|---|---|---|
| 7,013,203 B2 * | 3/2006 | Moore et al. | 700/286 |
| 7,437,216 B2 * | 10/2008 | Riesberg et al. | 700/286 |
| 7,606,638 B2 * | 10/2009 | Fortmann et al. | 700/287 |
| 7,962,246 B2 * | 6/2011 | Middendorf et al. | 700/287 |
| 8,154,139 B2 * | 4/2012 | Egedal | 290/44 |
| 2002/0013805 A1 | 1/2002 | Popescu | |
| 2002/0029097 A1 * | 3/2002 | Pionzio et al. | 700/286 |
| 2003/0105544 A1 * | 6/2003 | Kauffman et al. | 700/109 |
| 2007/0138797 A1 * | 6/2007 | Reidy et al. | 290/44 |
| 2008/0088129 A1 | 4/2008 | Altemark et al. | |
| 2009/0187282 A1 * | 7/2009 | Menke et al. | 700/287 |
| 2010/0057265 A1 * | 3/2010 | Szemkus | 700/287 |
| 2010/0332040 A1 * | 12/2010 | Garcia | 700/287 |
| 2011/0035068 A1 * | 2/2011 | Jensen | 700/287 |
| 2012/0010755 A1 * | 1/2012 | Stapelfeldt | 700/287 |
| 2012/0020786 A1 * | 1/2012 | Ayres | 416/1 |

FOREIGN PATENT DOCUMENTS

| | | |
|---|---|---|
| EP | 1 467 463 | 10/2004 |
| EP | 1 512 869 | 3/2005 |
| EP | 1 722 102 A1 | 11/2006 |
| EP | 1722102 A1 * | 11/2006 |
| WO | WO 01/86143 | 11/2001 |
| WO | WO 2006/066797 A1 | 6/2006 |

\* cited by examiner

WIND FARM

CROSS REFERENCE TO RELATED APPLICATIONS

The present application is a 35 U.S.C. §371 National Phase conversion of PCT/ES2008/000722, filed Nov. 19, 2008, which claims benefit of Spanish Application No. 200703055, filed Nov. 20, 2007, the disclosure of which is incorporated herein by reference. The PCT International Application was published in the Spanish language.

FIELD OF APPLICATION

The present invention regards a wind farm having at least two of wind turbine generators that can act as leader, thereby obtaining a system of collective operation for the wind farm, or as subject within the wind farm.

BACKGROUND OF THE INVENTION

There currently exist different ways of carrying out the control of a wind farm composed of a variable number of wind turbine generators.

On the one hand it is possible to carry out individual control of the different wind turbine generators, in which case each generator incorporates a local controller supervising the levels of voltage, current, etc. in the generator terminals.

Nevertheless, these magnitudes are not controlled at the wind farm level, and this can give rise to breaches of the requisites imposed by the network.

In any case, this solution can be suitable in wind farms with a small number of wind turbine generators, owing to the high cost of having central control in a substation compared to the total cost of the facilities.

One example of that control, applied to the particular case of frequency control, is described in patent EP 1 282 774. In it is described the control of a turbine which adapts the active power that it generates, as a function of the frequency measurements made in the terminals of the generator, with the aim of contributing towards restoring the frequency of the network in the event of any deviations of it above or below the permitted limits.

On the other hand, more widespread is the use of a central control unit controlling the global magnitudes necessary for guaranteeing the correct integration into the wind farm network. It is usual to locate that control unit in the electrical substation housing the transformer and the rest of the equipment necessary to transfer the energy generated by the wind farm to the electrical network.

Nevertheless, this solution also presents a series of drawbacks such that it requires additional equipment, but also, in the event of that equipment failing, the central control is rendered inoperative.

The patent application EP 1 467 463 is a good example of this control scheme and in it is described the mode of operation of a wind farm, in which the central control unit sends the necessary instructions to each wind turbine generator in the farm, depending on the frequency of the network.

The most common thing is that, as well as said central controller, each wind turbine generator incorporates its own control in order to thereby ensure the operation within the limits of that generator, in such a way that the patent application EP 1 512 869 describes a central controller which calculates the reactive power instructions for each wind turbine generator as a function of the voltage of the farm and an individual control in each wind turbine generator originates the particular voltage instruction for that reactive power demanded from the central control.

In this case, if a failure occurs in the central control, the reactive power instruction can be erroneous with regard to the global voltage control when the operating conditions in the network change. Nevertheless, it incorporates the advantage compared to the previous option that, as a result of the individual controls that are incorporated, the voltage levels in the terminals of each wind turbine generator are supervised so that, though they might not be optimum for control over the wind farm voltage, at least they do not exceed the permitted limits.

The patent application US 2002029097 A1 discloses a centralized control system for a wind farm composed of several wind turbine generators.

The patent application US 2002013805 A1 discloses a network of computers or of nodes which communicate with each other according to a protocol that can be of the token passing type.

SUMMARY

This specification describes a wind farm of the kind that comprises a series of wind turbine generators, said wind turbine generators comprising a rotor, a generator, a control unit and means of connection to the computing network for the wind farm of which they form part, in such a way that at least two of the wind turbine generators in the farm have alternative modes of operation, according to which each one of them can assume:
- a leader hierarchy for the wind farm, accessing the operating data of the rest of the wind turbine generators, calculating and sending instructions to the rest of the wind turbine generators making up that wind farm;
  or,
- a subject hierarchy, receiving and following the instructions coming from the leader wind turbine generator of the wind farm.

Likewise, another aim of the invention is to provide suitable transitions of leadership among wind turbine generators:
- when a wind turbine generator assumes the leader hierarchy, it sends data on the present variables of the control units to the rest of the subject wind turbine generators capable of exercising the leader hierarchy;
- when a wind turbine generator assumes the subject hierarchy, it keeps a copy of the data on the variables of the control units received from the wind turbine generator with the leader hierarchy, and;
- when a wind turbine generator changes his mode of operation from exercising the subject hierarchy to the leader hierarchy it initiates the control algorithms on the basis of the values of the variables of the previous leader.

In this way, the transition of the leadership from one wind turbine generator to another is done without any discontinuities.

In a preferred embodiment of the invention, those wind turbine generators that assume one option of hierarchy selected from the group consisting of leader and subject are assigned a predetermined position in a hierarchical list for their assignment as leader of the wind farm.

A wind turbine generator assumes the leader hierarchy when the wind turbine generators that are ahead of it in that hierarchical list are not operative.

Also, in a preferred embodiment of the invention, the pre-established order for the wind turbine generators to act as leader in the hierarchical list, is such that the operative wind turbine generator closest to the electrical substation of the wind farm acts as leader.

Another aim of the invention is to manage the reactive power generation in the wind farm. When a wind turbine generator assumes the leader hierarchy, it calculates instructions of one parameter selected from reactive power, power factor and voltage for all the wind turbine generators making up the farm, sending those instructions to the rest of the wind turbine generators via the wind farm computing network.

According to a preferred embodiment, when a wind turbine generator assumes the leader hierarchy, it accesses the data on measurements made in the substation.

According to a preferred embodiment, the instructions are calculated starting from a global instruction received from one option selected from a remote control and a system operator.

In a preferred embodiment the instructions are calculated taking into account the reactive power generation capacity by the converter of the wind turbine generators that are switched off.

In a preferred embodiment the wind turbine generator with the leader hierarchy calculates those instructions on the basis of the voltage measured in the connection point of that leader wind turbine generator to the wind farm electrical network.

An additional aim of the invention is to manage the active power generation in the wind farm. When a wind turbine generator assumes the leader hierarchy, it calculates active power limitation instructions for all wind turbine generators in the farm on the basis of the operating status of all the wind turbine generators and on the network frequency measurements made in at least one of them and it sends them to the rest of the wind turbine generators via the wind farm computing network.

In a preferred embodiment the power limitation of the farm is achieved by reducing the power of each of the wind turbine generators to a different degree on the basis of individual instructions generated by the wind turbine generator exercising the leader hierarchy.

Equally, the power limitation of the farm is achieved by carrying out a selective switching off of wind turbine generators.

The selective switching off of the wind turbine generators is done with the aim of extending the lifetime of the wind turbine generators making up the wind farm, taking into account the number of hours worked.

Depending on what the variable to control is, the measurements can come from the substation, from the connection point to the machine acting as leader, or from other wind turbine generators. So, for example, the substation measurements permit any kind of collective control to be carried out (power factor, voltage, frequency, etc.), while measurements of the wind turbine generators are more suitable for collective controls over voltage or frequency.

The wind farm described in the present invention displays advantages with respect to the prior art. On the one hand it carries out a collective control of the farm without any need to incorporate an additional control unit, since those operations are carried out in the local controllers of the kind that wind turbine generators are usually fitted with. Also, as this control option is included in several of the wind turbine generators forming the wind farm, this entails a redundancy that guarantees a coordinated control of the farm every time. Moreover, a coordinated control of reactive power can be carried out on the basis of the voltage, or of active power on the basis of the frequency, without any need to have additional means of measurement beyond those already incorporated by the individual wind turbine generators.

Another aim of the present invention is a wind turbine generator such that, when it is included in a wind farm as described above, it has two alternative modes of operation, according to which it assumes one option selected from the group consisting of:

a leader hierarchy for that wind farm, accessing the operating data of the rest of the wind turbine generators, calculating and sending instructions to the rest of the wind turbine generators making up that wind farm; and, a subject hierarchy, receiving and following the instructions coming from other wind turbine generators.

In order to complement the description that is going to be made forthwith, and with the aim of facilitating a better understanding of the characteristics of this invention, this specification is accompanied by a set of plans containing figures in which, on an illustrative rather than limiting basis, the most characteristic details of the invention have been represented.

DESCRIPTION OF A PREFERRED EMBODIMENT

The following description relates to a wind farm, and providing at least two wind turbine generators with a control system that permits a functioning of the wind farm of which they form part in such a way that one of the wind turbine generators acts as leader governing the behavior of the other wind turbine generators.

Moreover, said wind turbine generators are capable of functioning in two different ways, either acting as leader for the rest of the wind turbine generators such that it sends generation instructions to each of them or acting as subject and confining itself to obeying the orders coming from the leader wind turbine generator of the wind farm in that moment with the aim of achieving a correct functioning thereof.

Figure 1:
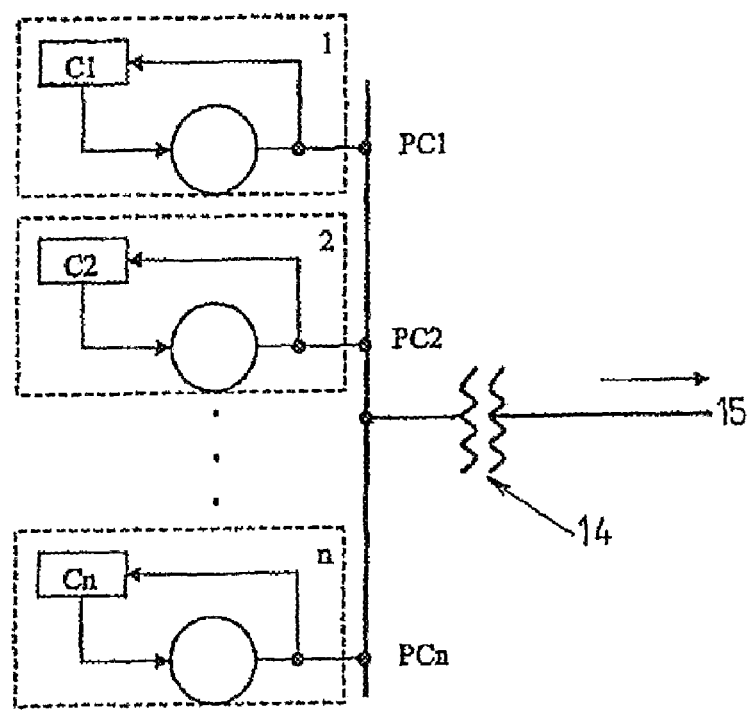
FIG. 1. Shows a view of a design of individual control in which each wind turbine generator incorporates a control unit.

With the commented figures in view and in accordance with the adopted numbering, we can see how FIG. 1 of the designs shows a conventional layout of the individual control of the wind turbine generators of a wind farm, such that each wind turbine generator 1, 2, ... n, incorporates a local control unit C1, C2, Cn, and on the basis of the measurements made in the connection point PC1, PC2, PCn, of the wind turbine generator, it regulates the active, reactive power, etc., generating the necessary orders for the power converter, in charge of generating the currents so that the corresponding wind turbine generator 1, 2, ..., n, can respond appropriately to the instructions of the control unit. The same figure shows the transformer 14 usually present and forming part of the electrical substation via which the energy produced is transferred to the electrical network.

Figure 2:
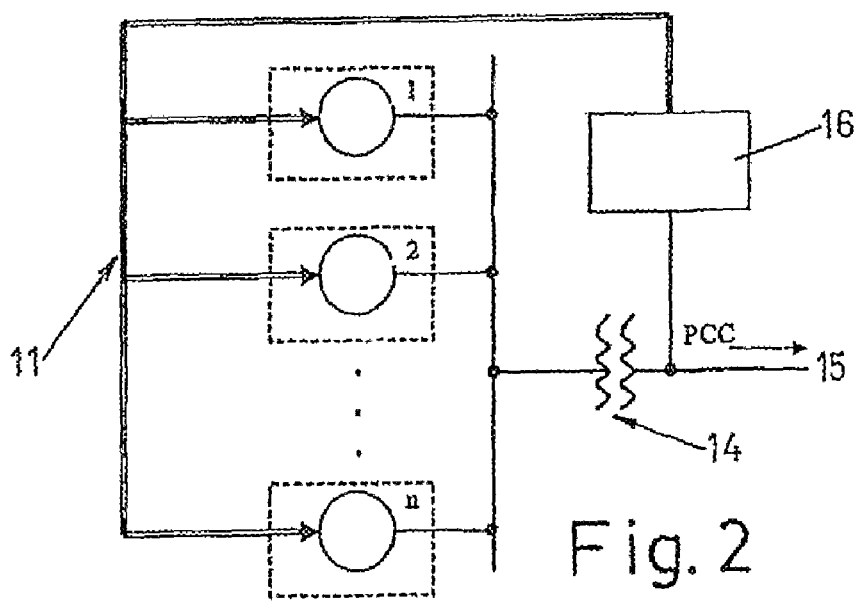
FIG. 2. Shows a view of a design of central control in which all the wind turbine generators in the wind farm are governed by a central control unit.

In FIG. 2 of the designs it can be seen the conventional layout of a wind farm governed by a central control unit 16, in such a way that, on the basis of the measurements made in the connection point of the farm PCC, said central control unit 16 calculates and sends instructions to each one of the wind turbine generators 1, 2, ..., n, via the wind farm computing network 11. That central unit central is usually located in the electrical substation of the wind farm.

Figure 3:
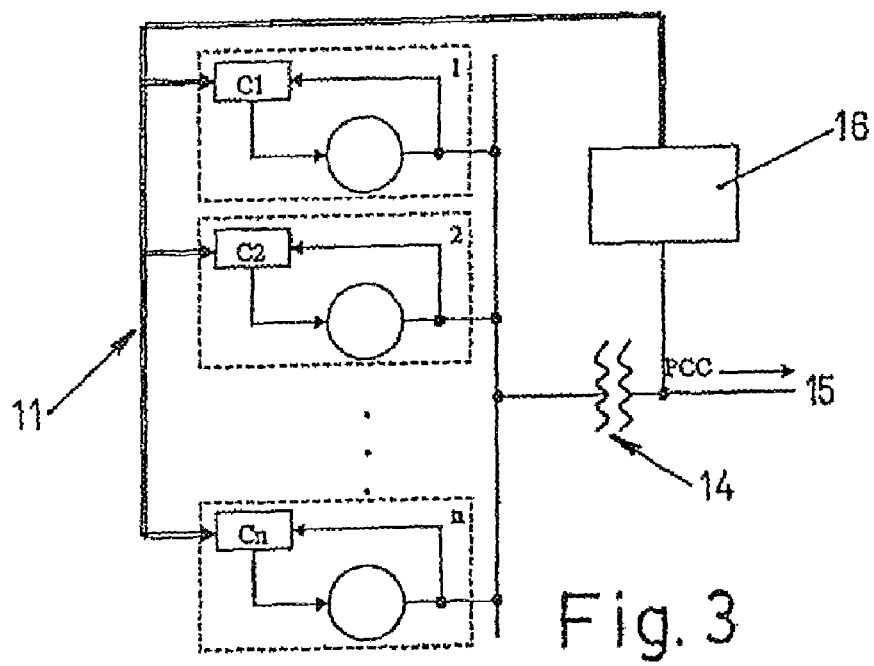
FIG. 3. Shows a view of a design of a wind farm governed by a central control unit and each wind turbine generator furthermore comprising an individual control.

FIG. 3 of the designs represents the conventional layout of a wind farm governed by a central control unit 106 which also incorporates faster local controls C1, C2, Cn, in order to ensure the functioning of the wind turbine generators 1, 2, ..., n, within range.

Figure 4:
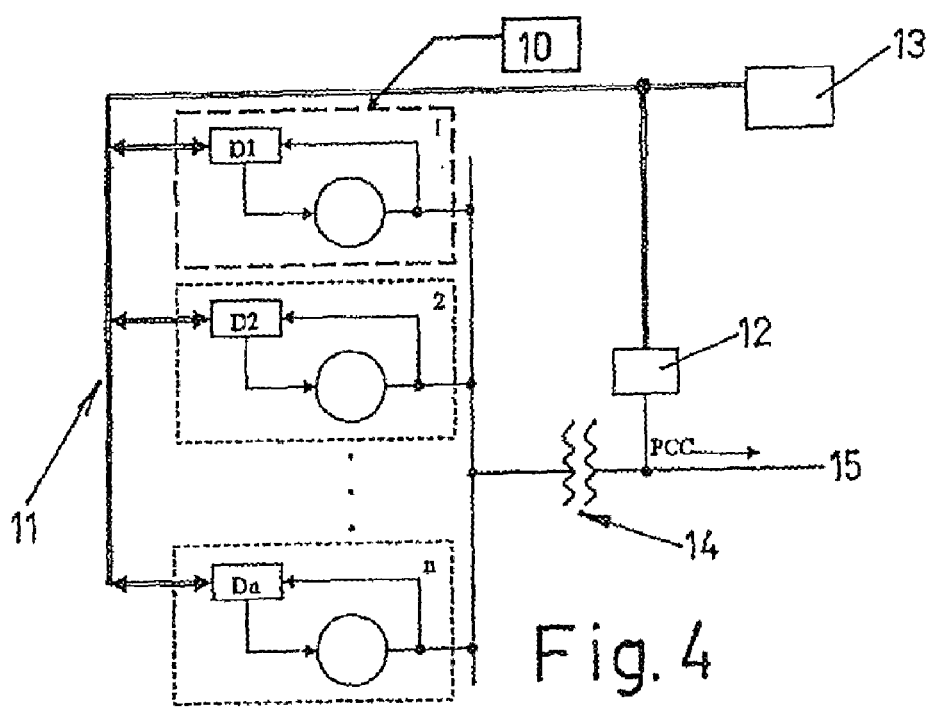
FIG. 4. Shows a view of a design, in accordance with the invention, in which all the wind turbine generators are connected via the computing network for the farm and one of the wind turbine generators acts as leader controlling the rest of the wind turbine generators which act as subjects.

FIG. 4 represents a wind farm in accordance with the invention made up of several wind turbine generators 1, 2, ..., n, connected to the electrical network 15 via a step-up transformer 14, in such a way that one of the wind turbine generators 10 will be the leader of the wind farm and the rest of the wind turbine generators will be the subjects that will follow the orders of the leader wind turbine generator 10.

All the wind turbine generators making up the wind farm will be connected via the farm computing network 11, in such a way that the leader wind turbine generator 10 has access to the operating data of each of the other wind turbine generators.

In a preferred embodiment, some measuring equipment 12 in the connection point of the farm PCC, will be connected to that computing network so that the leader wind turbine generator 10 can have access to the data extracted from that point. Moreover, in a preferred embodiment, said computing network 11 will be able to receive instructions from a remote control unit 13.

Figure 8:
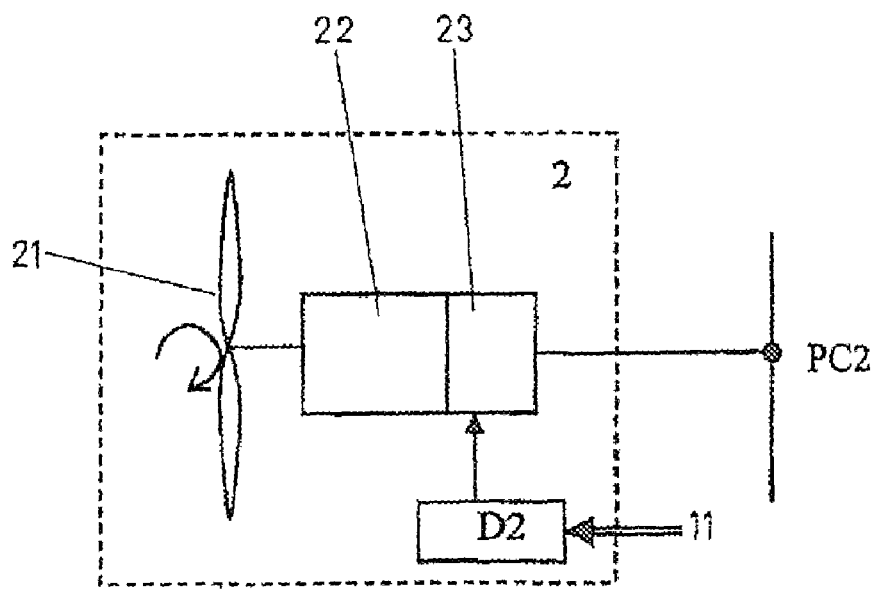
FIG. 8. Shows a view of a general design of a wind turbine generator.

Furthermore, each wind turbine generator 1, ..., n, shown in greater detail in FIG. 8 comprises a rotor 21, a generator 22, a converter 23, a control unit D2 and means for being connected to the farm computing network 11, via which it will receive the instructions from the leader wind turbine generator 10 in the event of acting as subject or of sending them to the other wind turbine generators in the event of acting as leader.

The control unit D2 will be in charge of processing those instructions and generating the necessary orders for the converter 23 so that they can be carried out.

The control unit D2 of the leader wind turbine generator 10 will have access to the operating data of the other wind turbine generators, and will also be capable of generating the necessary orders for the rest of the wind turbine generators which it will send via the wind farm computing network 11.

In a preferred embodiment, the leader wind turbine generator 10 will be able to receive instructions from a remote control 13 via the computing network 11 and, in a preferred embodiment, it will have access to measurements made in the connection point of the farm to the PCC network by the measurement equipment 12. On the bases of this data, the leader wind turbine generator will generate the instructions for each of the wind turbine generators, which it will receive via the wind farm computing network 11, in such way that it will exercise a collective control in order to ensure that the farm is correctly integrated into the network.

Figure 5:
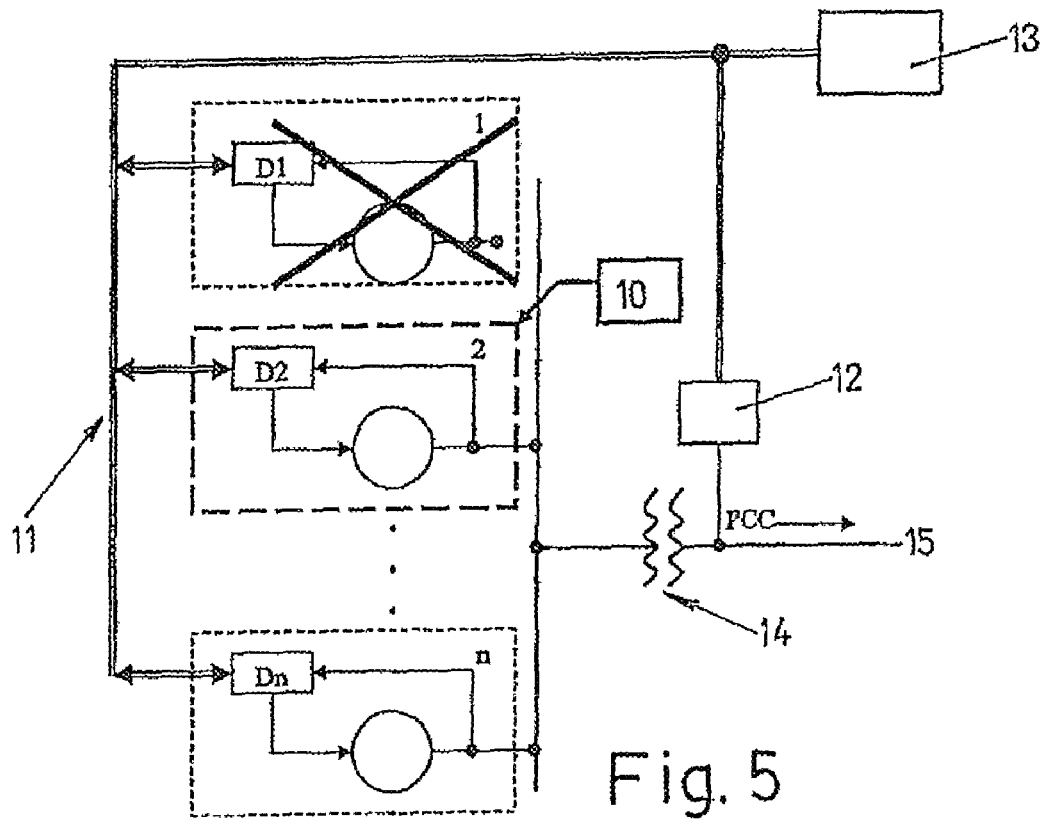
FIG. 5. Shows a view of a design of a wind farm in which the wind turbine generator that acted as leader has been rendered inoperative and the leader hierarchy has been reassigned to another wind turbine generator.

FIG. 5 of the designs shows the case in which the wind turbine generator 1 which previously acted as leader and carried out the collective control has been rendered inoperative. In view of this event, another wind turbine generator 2 passes over to acting as leader, and its control unit is the one that will coordinate the functioning of the rest of the wind turbine generators, as explained previously, in other words, acting as leader wind turbine generator 10.

In a preferred embodiment, for the reassignment of the role of leader there exists a pre-established order, so that those wind turbine generators that can assume that role are assigned a position P in a list, in accordance with the pre-established order. In a preferred embodiment they are ordered from lesser to greater according to the suitability for occupying the leadership. In this way, the machine occupying position P=1 will, if it is operative, act as leader. If it is not operative, the operative machine occupying the position closest to the priority one will act as leader. The rest of the operative machines will act as subjects.

In a preferred embodiment just a part of the wind turbine generators making up the wind farm have a control system like the one described in this invention, and can be distributed among the different arrays of the wind farm.

In this way, when, for maintenance reasons, a complete array needs to be disconnected, there will always be an operative wind turbine generator in the rest of the wind farm with the capacity to act as leader.

Figure 6:
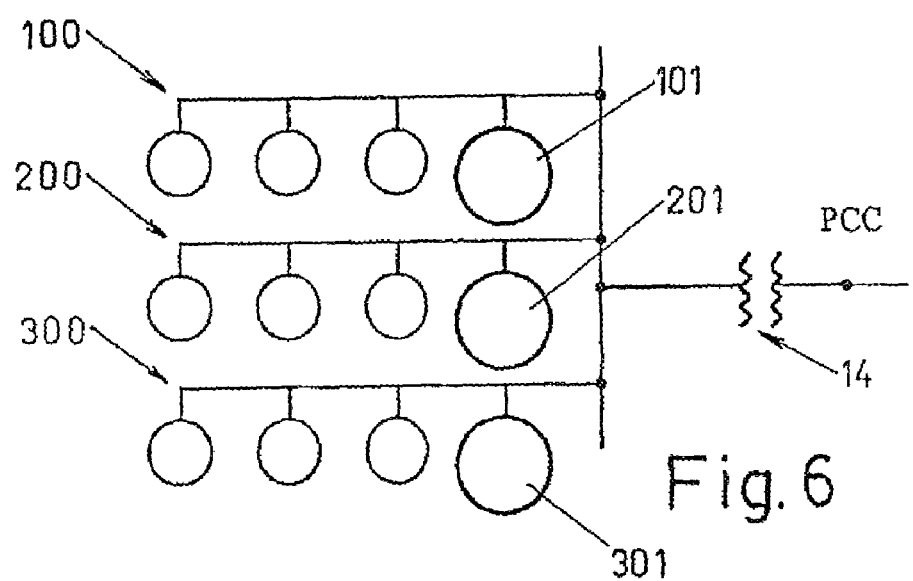
FIG. 6. Shows a view of a design of a wind farm composed of several wind turbine generators which can exercise the leader hierarchy.

FIG. 6 shows a preferred embodiment of a wind farm composed of three arrays 100, 200, 300, ..., each of which is made up of several wind turbine generators.

In one preferred embodiment at least one of the wind turbine generators 101, 201, 301, ... of each array 100, 200, 300, ..., possesses a control system like that described in this invention, so that they are ready for acting as leaders of the wind farm.

In a preferred embodiment, the leader of the wind farm sends the other wind turbine generators capable of adopting that role the status of the variables of the controllers so that they are all synchronized. In this way, in the event of the leader wind turbine generator leader being unable to carry on governing the other wind turbine generators, when another wind turbine generator takes control all the control units are suitably prepared and the transition of leadership from one wind turbine generator to another will be done without any discontinuities since the new leader wind turbine generator initiates the control algorithms in the same operating status as it was in with the previous leader.

In a preferred embodiment, the position P which each wind turbine generator suitable for taking on the role of leader occupies in the hierarchical list of possible leaders can be established in such a way that the first of them is occupied by the wind turbine generator closest to the connection point of the farm PCC to the network, since it has voltage measurements in the terminals of the generator that are closest to those of that connection point.

In this case, the other wind turbine generators suitable for taking on the leader hierarchy are ordered from lesser to greater in terms of proximity to that point.

In this way, in the event of not having measurements in the connection point provided by the measurement equipment 12, those measurements which the control unit of the wind turbine generator does have will serve for carrying out the collective control and they can then be corrected on the basis of the models of the farm network.

FIG. 6 shows a preferred embodiment in which the wind turbine generators suitable for acting the role of leader 101, 201, 301, etc., are the wind turbine generators closest to the connection point of the farm PCC of each array.

In a preferred embodiment the position P that is assigned to each of the wind turbine generators with the possibility of acting as leader is selected in terms of its proximity to the connection point of the farm PCC.

Figure 7:
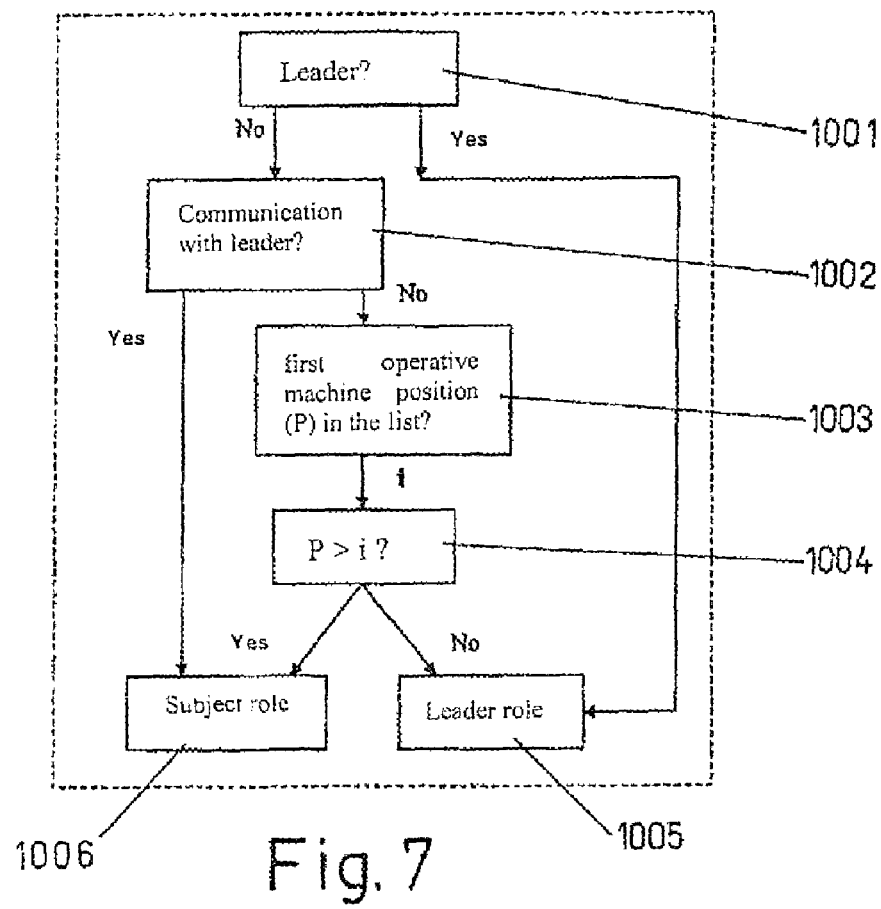
FIG. 7. Shows a view of the diagram of the algorithm incorporated into a database of the control unit of a wind turbine generator which can exercise the leader hierarchy for the assignment of that leader hierarchy.

FIG. 7 of the designs corresponds to the diagram of the algorithm incorporated into the control unit of the wind turbine generator which occupies the position P whose aim is to evaluate at each instant whether the wind turbine generator is carrying out or has carried out the collective control of the farm.

In a preferred embodiment, the algorithm is such that, in the first step 1001 each control unit is asked if it is the leader. If it is, it will carry on acting as such 1005. If not, and there is communication of the leader 1002 its role will be that of subject 1006. If it is not the leader and also does not receive communication from it 1003, it is asked what is the position of the first operative wind turbine generator "i". If P>i, the role of the wind turbine generator P will be that of subject 1006. Nevertheless, if this is not so, at that instant the machine P will become the leader and carry out the collective control 1005.

In a preferred embodiment, the wind turbine generator leading the functioning of the wind farm calculates and sends instructions on reactive power, or power factor, or voltage, to all the turbines making up the farm, doing so on the basis of voltage measurements in the terminals of its generator, or measurements taken in the connection point to which it has access.

Likewise, in a preferred embodiment these instructions are calculated starting from global orders received from a remote control or from the system operator. Moreover, these instructions are calculated taking into account the reactive power generation capacity by the converter of the wind turbine generators that are switched off.

In a preferred embodiment, if a wind turbine generator is acting as leader it calculates active power limitation instructions starting from the operating status of all the wind turbine generators and of the network frequency measurements carried out in several of them and it sends them to the other wind turbine generators making up the wind farm.

In a preferred embodiment, the active power instructions are calculated by the control unit of the leader wind turbine generator starting from frequency measurements made in the connection point to the network to which measurements it has access. The active power limitation can be carried out by means of a selective switching off of wind turbine generators, bearing in mind the number of hours worked with the aim of extending their lifetime, or calculating individual instructions for each of them, starting from the operating data available to the control unit of the wind turbine generator acting as leader.

The invention claimed is:

1. A method for operating a wind farm, the method comprising:
   providing a plurality of wind turbine generators, each of the plurality of wind turbine generators comprising a rotor, a generator, a control unit and a communication connection to a computing network, wherein at least two of the wind turbine generators are programmed and configured to alternatively operate in one of a plurality of modes of operation, the modes including:
   a leader hierarchy mode of operation comprising the steps of accessing operating data of the rest of the plurality of wind turbine generators, calculating and sending instructions to the rest of the plurality of wind turbine generators; and
   a subject hierarchy mode of operation comprising the steps of receiving and following one or more instructions from a respective wind turbine generator operating in the leader hierarchy mode of operation.

2. The method for operating a wind farm according to claim 1, wherein the leader hierarchy mode of operation further includes:
   sending data representing current conditions of the control units to the rest of the subject wind turbine generators capable of operating in the leader hierarchy mode of operation,
   and further wherein the subject hierarchy mode of operation includes:
   storing a copy of the data representing current conditions of the control units received from the wind turbine generator operating in the leader hierarchy mode of operation; and
   initiating control algorithms on the basis of the values of the variables of the respective wind turbine generator previously operating in the leader hierarchy mode of operation after a respective wind turbine generator changes mode of operation from the subject hierarchy mode of operation to the leader hierarchy mode of operation.

3. The method for operating a wind farm according to claim 2, further comprising assigning the wind turbine generators predetermined positions in a hierarchical list for their assignment to operate in the leader hierarchy mode of operation of the wind farm.

4. The method for operating a wind farm according to claim 3, wherein one of the wind turbine generators operates in the leader hierarchy mode of operation when one or more wind turbine generators that are ahead of it in the hierarchical list are not operative.

5. The method for operating a wind farm according to claim 4, wherein an operative wind turbine generator closest to the electrical substation of the wind farm operates in the leader hierarchy mode of operation.

6. The method for operating a wind farm according to claim 1, wherein the leader hierarchy mode of operation further comprises:
   calculating instructions based on at least one parameter representing reactive power, power factor and voltage for all the wind turbine generators making up the farm; and
   sending the instructions to the rest of the wind turbine generators via the wind farm computing network.

7. The method for operating a wind farm according to claim 6, wherein a wind turbine generator operating in the leader hierarchy mode of operation accesses data on measurements made in the substation.

8. The method for operating a wind farm according to claim 7, wherein the instructions are further calculated based on a global instruction received from one option selected from a remote control and a system operator.

9. The method for operating a wind farm according to claim 8, wherein the instructions are further calculated on the basis of voltage measured in a connection point of the respective wind turbine generator operating in the leader hierarchy mode of operation to the wind farm electrical network.

10. The method for operating a wind farm according to claim 9, wherein the instructions are further calculated using a reactive power generation capacity by the converter of wind turbine generators that are switched off.

11. The method for operating a wind farm according to claim 1, wherein the leader hierarchy mode of operation further comprises:
    calculating active power limitation instructions for all wind turbine generators in the farm on the basis of the operating status of all the wind turbine generators and on the network frequency measurements made in at least one of all the wind turbine generators; and
    sending the active power limitation instructions to the rest of the wind turbine generators via the wind farm computing network.

12. The method for operating a wind farm according to claim 11, wherein the leader hierarchy mode of operation further comprises accessing the data network frequency measurements made in the substation.

13. The method for operating a wind farm according to claim 12, wherein the active power limitation instructions are calculated starting from a global instruction received from one option selected from a remote control and a system operator.

14. The method for operating a wind farm according to claim 13, wherein a power savings of the wind farm is achieved by reducing the power of each of the wind turbine generators to a different degree on the basis of individual instructions generated by the wind turbine generator operating in the leader hierarchy mode of operation.

15. The method for operating a wind farm according to claim 14, wherein a power savings of the farm is achieved by carrying out a selective switching off of wind turbine generators.

16. The method for operating a wind farm according to claim 15, wherein an expected lifetime of the wind turbine generators making up the wind farm is extended by the selective switching off of the wind turbine generators, taking into account a number of hours worked.

17. A wind farm, comprising
    a plurality of wind turbine generators, each wind turbine generator comprising a rotor, a generator, a control unit and means of connection to a computing network of the wind farm; and
    a computing network connecting the control units of all turbine generators of the wind farm,
    wherein the control unit of at least two turbine generators of the wind farm is configured for assuming one mode of operation selected from:
    a leader hierarchy mode of operation that includes accessing operating data representing the rest of the plurality of wind turbine generators, calculating and sending instructions to the rest of the plurality of wind turbine generators; and
    a subject hierarchy mode of operation that includes receiving and following one or more instructions from a respective wind turbine generator operating in the leader hierarchy mode of operation.

18. The wind farm according to claim 17, further comprising a remote control unit connected to the computing network.

19. The wind farm according to claim 17, further comprising measuring equipment connected to the computing network.

20. A wind turbine generator, comprising:
    a rotor, a generator, a control unit and a communication means of connection to a computing network, wherein the wind turbine generator is programmed and configured to alternatively operate in a plurality of modes of operation, the modes including:
    a leader hierarchy mode of operation that includes accessing operating data representing a plurality wind turbine generators of a wind farm, calculating and sending instructions to the plurality of wind turbine generators; and
    a subject hierarchy mode of operation that includes receiving and following one or more instructions from a respective wind turbine generator operating in the leader hierarchy mode of operation.

* * * * *

UNITED STATES PATENT AND TRADEMARK OFFICE
CERTIFICATE OF CORRECTION

PATENT NO.       : 8,355,825 B2
APPLICATION NO.  : 12/743444
DATED            : January 15, 2013
INVENTOR(S)      : Sádaba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 409 days.

Signed and Sealed this

First Day of September, 2015

Michelle K. Lee
*Director of the United States Patent and Trademark Office*